(12) United States Patent
Manley et al.

(10) Patent No.: US 6,470,836 B1
(45) Date of Patent: Oct. 29, 2002

(54) WATER JACKET ASSEMBLY

(75) Inventors: David William Manley, Christmas Hills; Krzysztof Mastalerz, Ringwood North, both of (AU)

(73) Assignee: Rheem Australia Pty Ltd., Sydney (AU)

( * ) Notice: Subject to any disclaimer, the term of this patent is extended or adjusted under 35 U.S.C. 154(b) by 0 days.

(21) Appl. No.: 09/719,675

(22) PCT Filed: Jun. 15, 1999

(86) PCT No.: PCT/AU99/00473
§ 371 (c)(1),
(2), (4) Date: Feb. 9, 2001

(87) PCT Pub. No.: WO99/66267
PCT Pub. Date: Dec. 23, 1999

(30) Foreign Application Priority Data

Jun. 15, 1998 (AU) .............................................. PP 4105

(51) Int. Cl.⁷ ................................................. F24H 1/14
(52) U.S. Cl. .......................... 122/40; 392/487; 392/489
(58) Field of Search ...................... 122/40, 41; 392/465, 392/485, 486, 487, 489

(56) References Cited

U.S. PATENT DOCUMENTS

| | | | | |
|---|---|---|---|---|
| 858,351 A | * | 6/1907 | Roche et al. ................ | 392/486 |
| 4,002,201 A | | 1/1977 | Donaldson | |
| 4,346,835 A | * | 8/1982 | Trotter et al. ............ | 122/448 R |
| 4,550,689 A | * | 11/1985 | Wolter ..................... | 122/448 R |
| 4,804,040 A | | 2/1989 | Jan-Ove et al. | |
| 4,813,478 A | | 3/1989 | Jönsson et al. | |
| 4,911,235 A | | 3/1990 | Andersson et al. | |
| 4,915,163 A | | 4/1990 | Matsunaga et al. | |
| 4,926,932 A | | 5/1990 | Ohara et al. | |
| 4,966,227 A | | 10/1990 | Andersson | |
| 4,976,313 A | | 12/1990 | Dahlgren et al. | |
| 5,050,671 A | | 9/1991 | Fletcher ..................... | 165/166 |
| 5,291,945 A | | 3/1994 | Blomgren et al. | |
| 5,307,869 A | | 5/1994 | Blomgren | |
| 5,322,216 A | * | 6/1994 | Wolter et al. ............. | 236/25 R |
| 5,355,842 A | | 10/1994 | Schmitz et al. | |
| 5,586,547 A | * | 12/1996 | Nixon ........................ | 122/44.2 |
| 5,727,118 A | | 3/1998 | Roussel et al. ............. | 392/494 |
| 6,061,499 A | * | 5/2000 | Hlebovy ..................... | 392/485 |

FOREIGN PATENT DOCUMENTS

| | | |
|---|---|---|
| DE | 3302447 A1 | 7/1984 |
| EP | 0 393 937 A2 | 10/1990 |
| EP | 0 397 487 A2 | 11/1990 |
| EP | 0 414 435 A2 | 2/1991 |
| EP | 0 206 836 | 6/1993 |
| EP | 0 611 941 A2 | 8/1994 |
| EP | 0 611 941 A3 | 7/1995 |
| EP | 0 611 941 | 12/1999 |
| WO | WO 91/11252 | 8/1991 |
| WO | WO 93/18360 | 9/1993 |
| WO | WO 94/28367 | 12/1994 |
| WO | WO 95/31686 | 11/1995 |
| WO | WO 95/35474 | 12/1995 |
| WO | WO 96/38700 | 12/1996 |
| WO | WO 96/41995 | 12/1996 |
| WO | WO 97/00415 | 1/1997 |
| WO | WO 97/08506 | 3/1997 |
| WO | WO 97/15798 | 5/1997 |
| WO | WO 97/16691 | 5/1997 |
| WO | WO 97/37188 | 10/1997 |
| WO | WO 01/44727 A1 | 6/2001 |

* cited by examiner

*Primary Examiner*—Gregory Wilson
(74) *Attorney, Agent, or Firm*—Cahn & Samuels, LLP

(57) ABSTRACT

A water jacket assembly for an instantaneous gas fired water heater, the assembly including pressed profiled plates made of copper or copper coated steel, one plate being the inverted image of the other, said plates being placed together in pairs, the pairs of plates being arranged in a parallel array to form a heat exchanger, the heat exchanger being bordered by a water jacket comprising overlapping side and end panels of copper or copper coated steel attached to the array of plates, the assembly being fused together to define a combustion chamber with discrete combusted gases and water passages within said assembly.

39 Claims, 6 Drawing Sheets

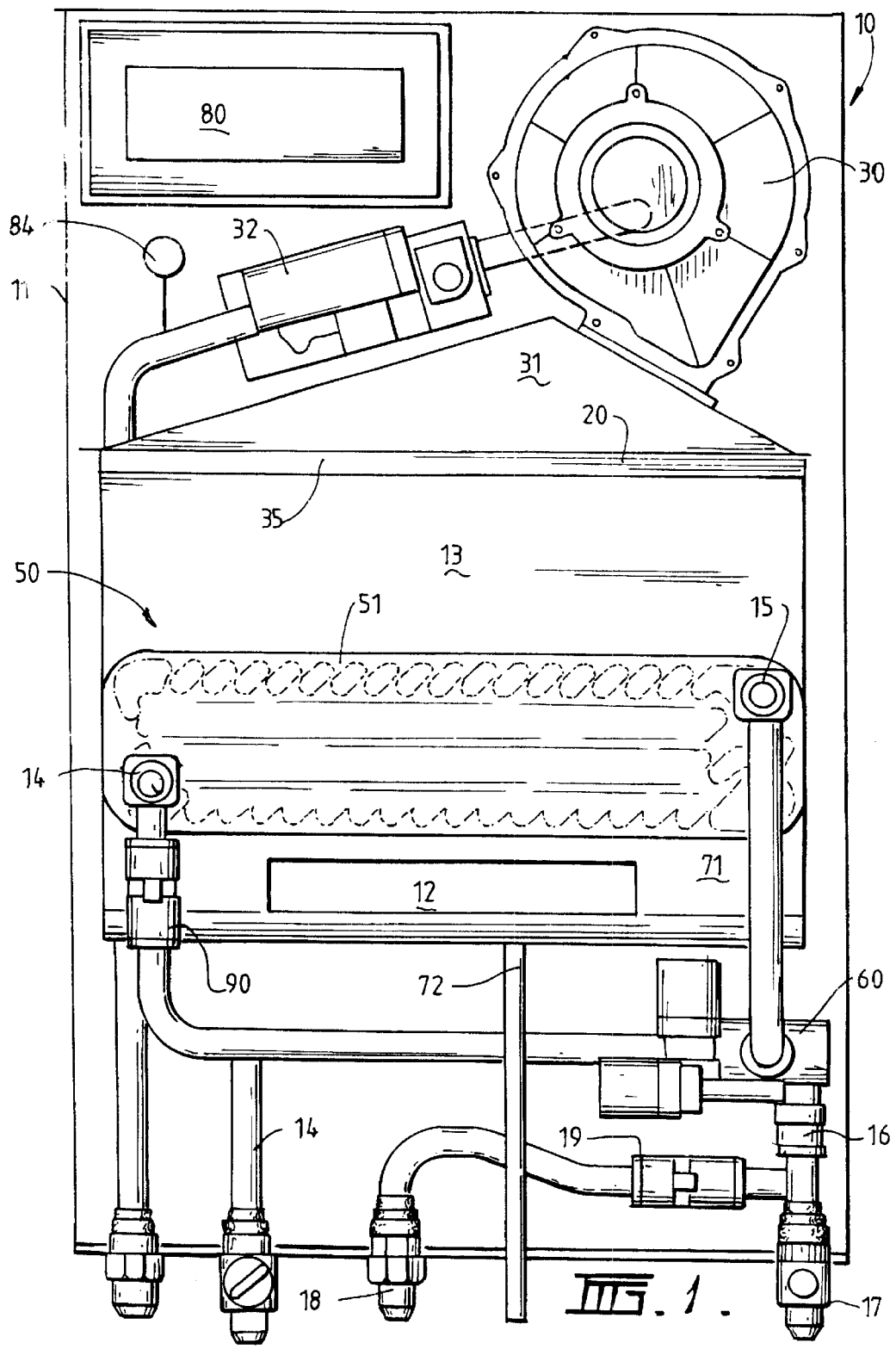

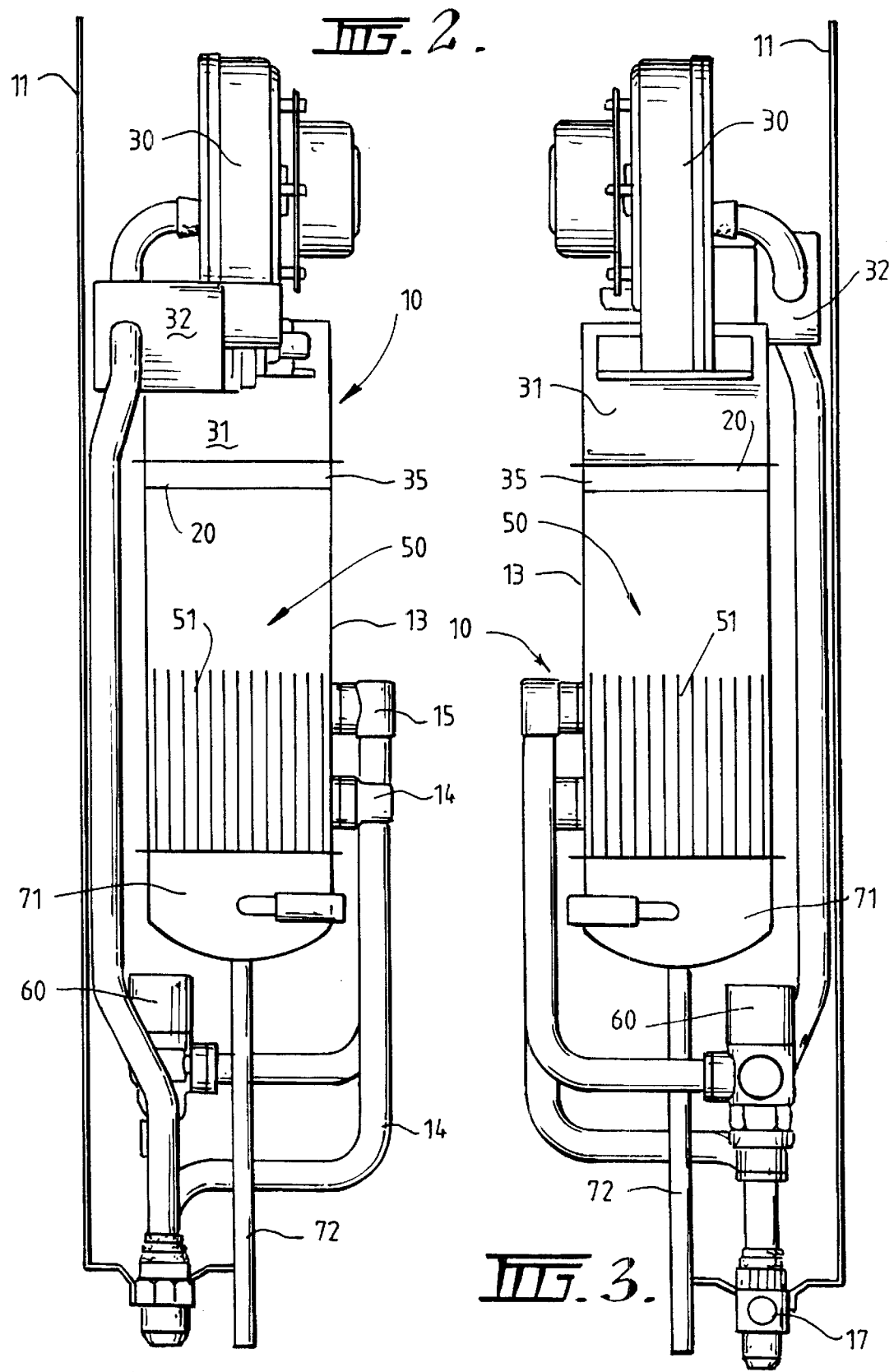

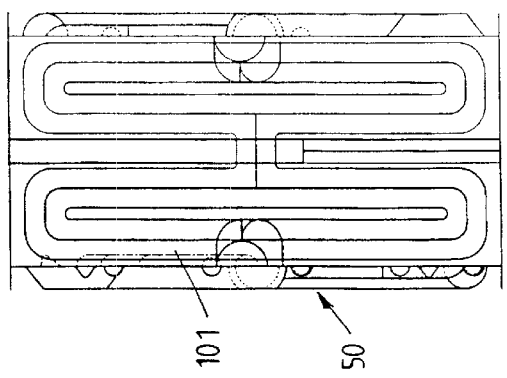
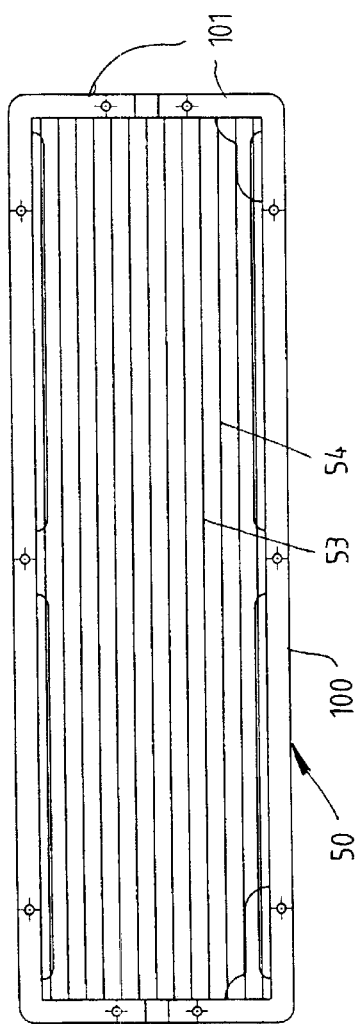
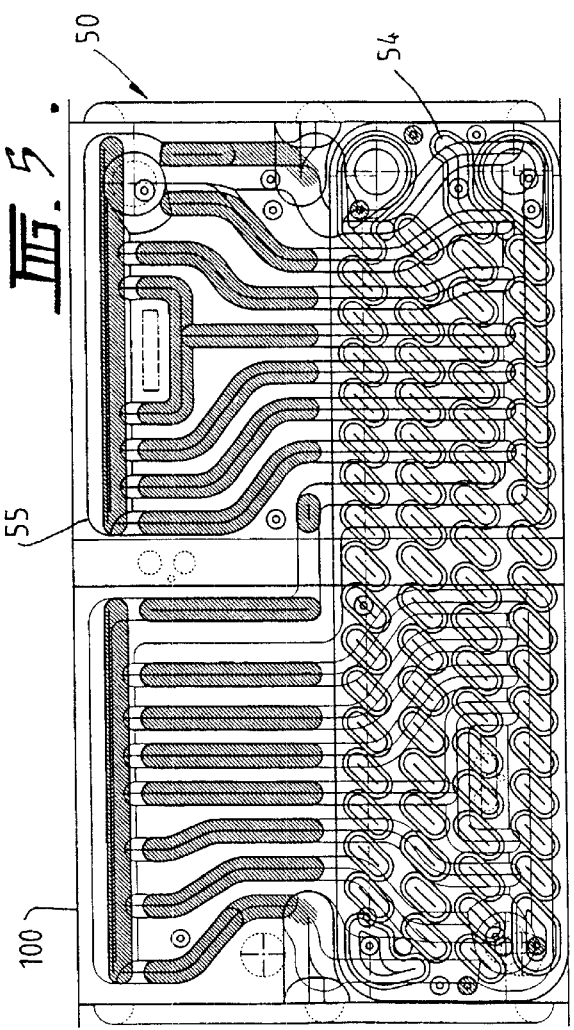

WATER JACKET ASSEMBLY

FIELD OF THE INVENTION

This invention relates to a heat exchanger or water jacket assembly suitable for use with water heaters and in particular to instantaneous gas fired water heaters to provide hot water on demand, and a method of manufacturing the same.

PRIOR ART

Approximately 30% of the world's hot water heaters manufactured are of the "storage type", namely a water heater whereby a tank of water is heated by electricity, gas or oil fired burners. This type of water heater can be inefficient, bulky and constantly suffers from the escape of heat to the surroundings. A problem with storage water heaters is the limitation in volume of hot water they can provide at any one time.

Approximately 70% of the world's water heaters manufactured are of the "instantaneous type" where hot water is provided on demand by use of means to instantaneously heat the water as it flows through the heater. This type of water heater has been very pressure dependent with limitations on the volume of hot water it can provide on an ongoing basis. Also problems are commonly derived from difficulties in constructing and assembling cost effective, long life heat exchangers and water jackets which achieve minimum heat loss to the surroundings and maximum fluid-to-gas heat exchange surface areas.

SUMMARY OF THE INVENTION

In accordance with a first aspect of the present invention, there is provided a water jacket assembly for an instantaneous gas fired water heater, the assembly including pressed profiled plates made of copper or copper coated steel, one plate being the inverted image of the other, said plates being placed together in pairs, the pairs of plates being arranged in a parallel array to form a heat exchanger, the heat exchanger being bordered by a water jacket comprising overlapping side and end panels of copper or copper coated steel attached to the array of plates, the assembly being fused together to define a combustion chamber with discrete combusted gases and water passages within said assembly.

It is preferable that the profiled plates of the heat exchanger are adapted to cause turbulent flow of water through the water passages, and turbulent flow of combusted gases past the exterior, the exterior also providing escape routes for condensate that in use collects on the external surfaces of the heat exchanger.

It is preferable that the water jacket has a cold water inlet and a hot water outlet, at least one gas burner being positioned within the combustion chamber whereby cold water flows through the assembly to exit as hot water.

Preferably, the at least one gas burner is positioned above the heat exchanger and the heater includes a fan that mixes gas with air and forces the gas/air mixture to the burner and, as combusted gases past the heat exchanger.

According to a further aspect of the present invention there is provided a method of manufacturing a water jacket assembly comprising pressing profiled heat exchanger plates, side panels and end panels out of copper or copper coated steel, placing two plates together, one being the inverted image of the other to form a pair of abutting plates, placing a plurality of pairs of heat exchanger plates together to form a sandwich, attaching the side panels to the sandwich and placing the end plates on each corner so that the side and end panels overlap, holding the assembly with a jig, and placing the assembly in an oven for a predetermined time to fuse the copper surfaces together to provide an integral assembly having a combustion chamber and discrete combusted gases and water passageways within said assembly.

DESCRIPTION OF THE DRAWINGS

An embodiment, incorporating all aspects of the invention, will now be described, by way of example only, with reference to the accompanying drawings in which:

FIG. 1 is a front elevational view of a water heater,

FIG. 2 is a side elevational view of the heater,

FIG. 3 is an opposite side elevation view of the heater,

FIG. 5 is a side elevational view of the water jacket assembly, FIG. 6 is an elevational view of the water jacket assembly, FIG. 7 is a plan view of the water jacket assembly.

DESCRIPTION OF PREFERRED EMBODIMENTS

Figure 4:
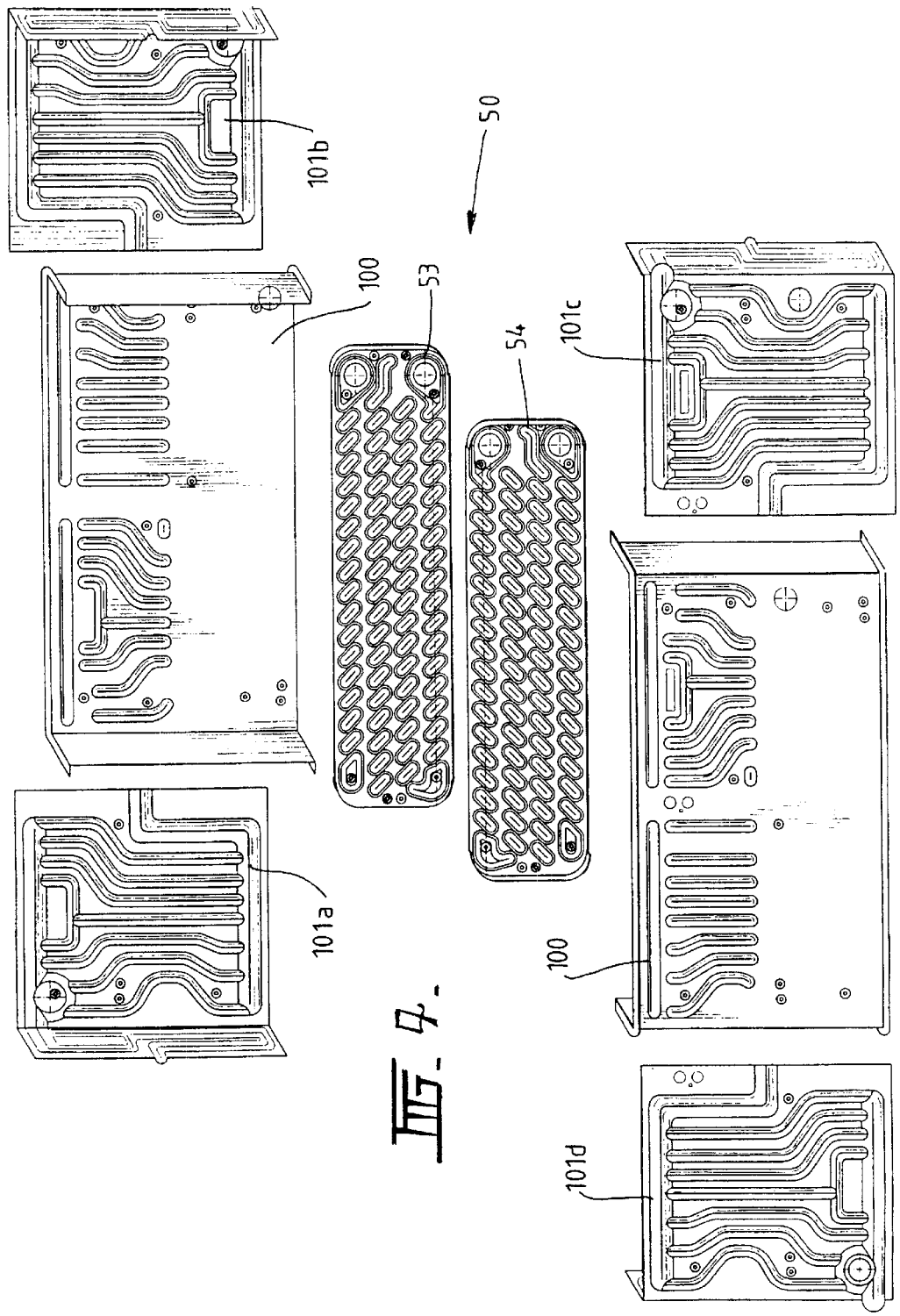
FIG. 4 is an exploded perspective view of components for a water jacket assembly.

The domestic water heater illustrated in the accompanying drawings is fuelled by gas and operates to provide an instantaneous flow of hot water thus there is no need for a tank to store a quantity of hot water.

As shown in FIGS. 1 to 3, the water heater 10 is housed in a rectangular enclosure 11 that is designed to be mounted flush against an external wall. The heater needs to be coupled to a supply of gas and it is understood that the heater can be adapted to work on a variety of commercially available gases. The exhaust gases are vented to the atmosphere via a small aperture 12 at the front 13 of the heater. Alternatively, the heater can be installed internally with exhaust gases being vented to the atmosphere via a small flue that would extend either through the wall cavity or up through the ceiling.

In summary, the water heater 10 comprises a series of gas burners 20 positioned above a water jacket assembly 50 so that heat from the gas burners 20 passes through a heat exchanger 51 that forms part of the water jacket assembly 50 to heat up a supply of cold water that is arranged to flow through the heat exchanger to exit the heat exchanger as hot water. A control mechanism controls the amount of gas that is burned at the burners 20 dependent on the flow of water and the temperature requested, ie on the demand. The burning capacity of the gas burners is enhanced by the provision of a fan 30 that mixes gas with air before the burners 20 to ensure use of the most efficient air fuel mixture. The fan 30 also operates to force the hot air generated by the burners 20 down in a vertical direction through the heat exchanger 51. Heat exchangers of this type produce condensation which drips down into a collection tray 71 mounted at the base of the enclosure 11 for discharge 72 into either the sewerage or storm water drains. It is understood that suitable plumbing would be used to facilitate this discharge.

The series of burners 20 are positioned across the top of the heater 10 and are fed by an air gas mixture via a mixing chamber 31 which is in turn fed from a modulating gas valve 32 and an electrically driven fan 30 that mixes the gas in the air prior to feeding the gas mixture to the burner. The burners 20 are in the form of a ceramic plate 35 having a series of small apertures (not shown) extending therethrough. The apertures provide a very large number of small flames that project downwardly towards the water jacket assembly 50. The flames are arranged to terminate at a position that is just above the position of the heat exchanger 51 that is positioned in the lower half of the water jacket assembly.

As shown in FIGS. 1 to 3, the cold water inlet 14 extends into the water jacket base on the left hand side of the unit as viewed in FIG. 2 with the hot water exiting the water jacket assembly 50 from the right hand side of the unit towards the top of the heat exchanger 51 at the hot water outlet 15. Notwithstanding this arrangement it is understood that the direction of flow may be reversed. A water flow meter 90 monitors flow of water at the cold water inlet 14. A first temperature sensor T1 is positioned on the cold water inlet and a second temperature T2 sensor is positioned on the hot water outlet 15 from the heat exchanger 51. A third temperature sensor T3 is positioned on a water flow control valve 60 which is coupled both to the cold water inlet 15 and the hot water outlet 16. The supply of gas flows up from the base of the unit along one side through the modulating gas valve 32 to the fan 30 as shown in FIGS. 1 to 3. The hot water outlet 16 from the water valve 60 has a first outlet 17 that is designed to provide water up to a temperature of 80° C. and a second lower temperature outlet 18 that dispenses water up to a temperature of 50° C. via a flow sensor 19. Thus, it is important that water heaters of this kind have safety controls to prevent scalding. When flow is detected in outlet 18, the electronic control system automatically limits the maximum available temperature to 50° C. The combustion gases on passing through the heat exchanger 51 exit the unit at the base of the heat exchanger via the rectangular outlet 12 in the front face 13 of the heater. These gases are at a temperature that is lower than the temperature of the hot water, for the main part of the water heaters operation, thus the loss of the heat to the surrounding is kept to a minimum.

An electronic controller 80 is mounted near the top of the heater as shown in FIG. 1 to control operation of the heater 10. To operate, the heater has to be coupled to a source of gas, a source of cold water and a source of electricity.

Figure 8:
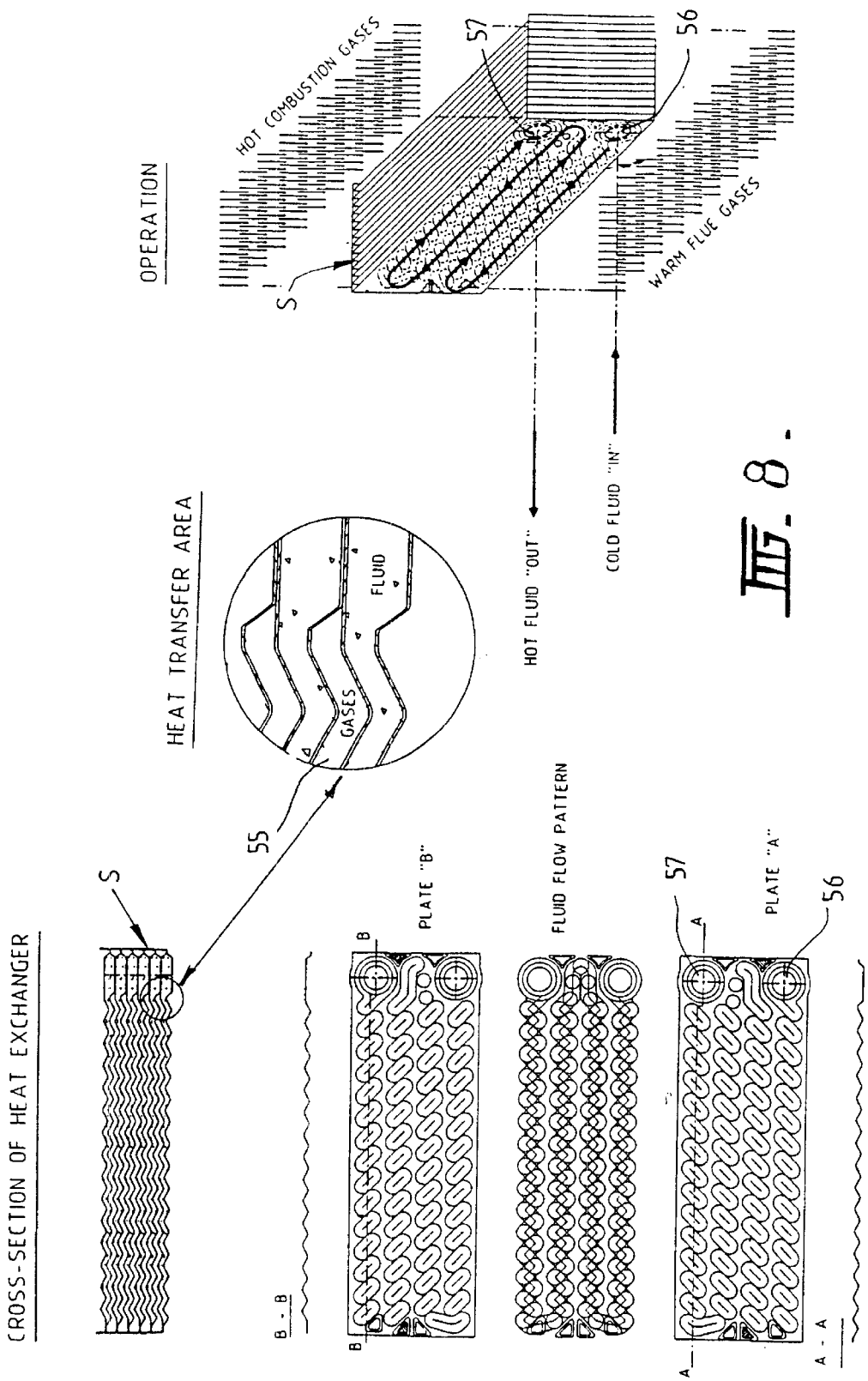
FIG. 8 is a series of views showing a method of assembly and flow path of a heat exchanger that forms part of the water jacket assembly.

The water jacket assembly 50, in accordance with preferred embodiments of some aspects of the present invention, is illustrated in detail with reference to FIGS. 4 to 8 and essentially comprises an external water jacket 52 that supports an internally positioned heat exchanger 51 that is in the form of varying numbers of pairs of rectangular plates 53, 54 depending on the heat exchange requirements. Each pair is positioned in abutting contact to define a convoluted water path therebetween. As shown in FIG. 8, the plates are mounted as a sandwich S with each pair positioned parallel and spaced apart from the adjacent pair. The gaps 55 between the pairs allow passage of hot air from the gas burners and the plates are interconnected so that the water flows through a convoluted passage along each plate and through adjacent plates as shown in FIG. 8. The cold water enters one side 56 of the rectangular sandwich S and exits as hot water at the exit 57 on the same side of the sandwich S. Thus the hot water exit 57 is near the hot combustion gases whilst the cold inlet 56 is adjacent the base of the unit that is near the warm flue gases. This design of heat exchanger ensures that there is an even heat distribution laterally of the heat exchanger with a temperature distribution becoming progressively hotter upwards from the base to the top. The uniform lateral temperature distribution ensures uniformity of heat transfer and prolongs the life of the heat exchanger.

The water jacket assembly 50 essentially comprises three metal plates, namely a side plate 100 that is inverted to encase opposite sides of the assembly and an end plate 101 that is inverted twice to produce four plates 101a, b, c, d, that, as shown in FIG. 4 envelop and overlap the ends to define the water jacket 55. The third plate defines the rectangular plates 53, 54 which when mounted in spaced apart pairs define the sandwiches that constitutes the heat exchanger 51. As shown in FIGS. 5 to 7, the sandwiches of heat exchanger plates is located towards the base of the unit with the water jacket having a fluid passageways along the top half of the assembly and down across the ends. The space defined between the water jacket and the top of the heat exchanger 51 is a combustion chamber. The water jacket is positioned externally of the heat exchanger 51 with the gas flames of the burners playing along the centre line of the assembly 50 within the combustion chamber. This feature has the effect of drawing off heat from the gas flames to reduce sideways escape of heat and also reduce the temperature of the hot gases at the heat exchanger 51. As shown in FIG. 5, the cold water enters the assembly 50 from one side at the base and exits the assembly on the opposite side towards the top of the heat exchanger 51. Initially, the water moves in two directions around the sides and ends of the water jacket 55 so that water flows through the whole of the water jacket before passing through the heat exchanger. This reduces the likelihood of the heat exchanger 51 being overheated and reduces waste of hot gases.

By manufacturing the assembly from three plates that are simply reversed, the whole assembly can be produced from a simple stamping operation. Furthermore, in the preferred embodiment, the assembly is manufactured from stainless steel plates coated in copper and the components are assembled together by use of a jig (not shown) so that the componentry is in abutting contact with all the abutting surfaces being copper to copper. When the assembly is placed in an oven for a predetermined period at a temperature to fuse the copper to provide an integral unit in which all the components are bonded together and the water and air passageways are defined accurately with no leakages. There is thus no need for welding, soldering, or other fasteners and this fusing of the copper coating ensures satisfactory operation over a long life. The design of a convoluted passage for water flow is also specifically designed to encourage turbulent flow ensure that there are no stagnant water pockets or hot spots in the unit. Furthermore the external shape of the plates provides a convenient route for run-off of condensate that forms on the exterior of the assembly. The water jacket assembly 50 has proved extremely efficient and allows maximum transfer of heat from the gas flames to the water without excessive heat being lost to exhaust.

A gas pressure sensor 84 is positioned at the gas entry of the modulating gas valve 32 to sense a drop in gas pressure to reduce the output of the unit should there be a shortage of gas pressure. Conventional domestic gas pressures operate to a maximum of 200 megajoules per hour and are limited by the gas pressure so that if too many appliances are used at once there is often a drop in the gas pressure. To ensure that a drop in gas pressure does not reduce the temperature of the hot water, the gas pressure sensor 84 causes the rate of flow of water to be reduced to compensate for a reduction in gas pressure so that the unit operates at the desired temperature albeit at a reduced output in terms of litres per minute. Another feature of the gas valve and controller is the use of an oxygen sensor that detects the amount of oxygen in the flue gases. If the oxygen content of the flue gas is either too high or too low, a signal is fed back to the controller 80 to change the gas flow to ensure an optimum mixture. The computerized controller 80 monitors three temperatures, namely the T1 which is the temperature at the inlet of the cold water, T2 the temperature at the heat exchanger outlet, and T3 which is the outlet hot water temperature of the unit. The third temperature monitor T3 includes an adjustable dial by which the user can adjust the desired output temperature. The controller 80 on sensing the three temperatures can then control the rate of water flow through the unit and also the gas input through the modulated gas valve 32 and the air input by varying the fan speed. The controller 80 varies the parameters to ensure maximum efficiency. The heater is designed to produce 32 litres per minute of water at 25° C. above start up temperature. A conventional shower uses 7 to 11 litres per minute which means that the heater can operate to run three to four showers at once without loss of temperature or reduced water flow.

The flow meter 90 positioned in the cold water inlet 14 comprises a substantially cylindrical casing that includes a deflector that deflects the flow of water and an impeller. The impeller is mounted on a shaft and is constructed of plastics material impregnated with a magnetic material. To reduce corrosion of the impeller, an epoxy coating is positioned on the exterior of the impeller. The magnetic field that is caused by rotation of the impeller ensures that an electrical signal is produced that is responsive to the speed of rotation of the impeller. The speed of rotation is in turn dependent on the rate of flow of water pumped through the meter. The electrical signal that is produced by the flow meter 90 is then sent to the controller 80 to control the operation of the water heater in relation to demand. It is also understood that with this meter 90 a visual indication of the rate of flow through the meter can be displayed at the unit and/or at remote controls. The electrical signal that is produced by the flow meter 90 is then sent to the controller 80 to control operation of the water heater in relation to demand.

Figure 9:
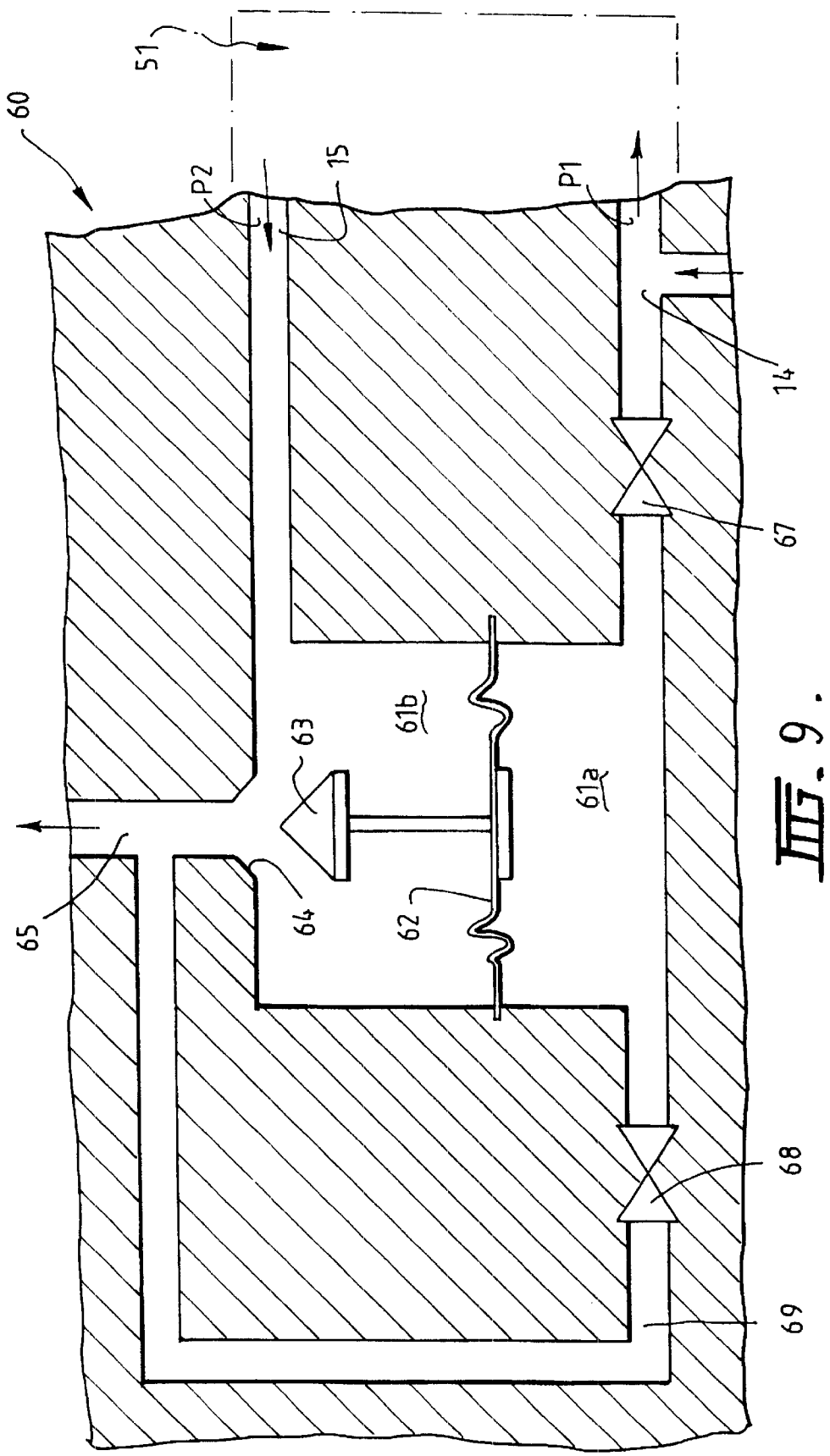
FIG. 9 is a schematic view of a flow control valve that forms part of the water heater.

The flow control valve 60 as shown in FIG. 9 comprises a valve chamber 61, sub chambers 61a and 61b separated by a piston or a flexible diaphragm 62 that is coupled on one side 61b to a flow constriction member 63 that seats on a valve seat 64 at the outlet 65 of the valve. The sub chambers 61a and 61b are coupled to the inlet 14 and outlet 15 of the heat exchanger 51. The sub chamber 61a is also coupled to the cold water inlet 14 via a first solenoid cut-off valve 67. The sub chamber 61a is also coupled to the outlet 65 through a by-pass conduit 69 cut-off via a second solenoid valve 68. There is a pressure drop across the heat exchanger which means that P1 at the inlet is greater than P2 at the outlet which is in turn greater than the exit pressure P3.

In operation of the flow control valve the solenoid valves are generally closed, however, if there is too much demand for hot water and a need to reduce the flow, the first solenoid cut-off valve 67 opens while the second solenoid valve 68 remains closed which has the effect of causing a greater pressure P1 in the sub chamber 61a which forces the diaphragm and the valve 63 to partially close against the seat 64 to reduce output flow. If an increase in flow is required the first solenoid valve 67 closes and the second solenoid valve 68 opens which has the effect of reducing the pressure difference across the diaphragm which causes the diaphragm to resiliently return to open the valve 63 to increase the output flow. In a situation where the heat exchanger 51 has an excess quantity of hot water and there is a danger that the hot water will overshoot the maximum temperature, both solenoid valves 67 and 68 opens which has the effect of causing a proportion of cold water to flow from the inlet 14 past the diaphragm into the outlet via the second solenoid valve 68 and conduit 69. This in turn cools down the temperature of the outlet water to ensure that it is within the desired parameters.

To start up the heater, an electrically operated glowing surface is utilised in the combustion chamber and the control ensures that when the tap is turned on causing flow of water, there is first a pause to purge any combustible gases within the combustion chamber. Then, there is a short pause during which the glow surface ignitor commences to glow or spark ignition activates and then an air gas mixture enters the combustion chamber. If there is no combustion, the water heater shuts down the gas flow and the whole process is repeated. If this fails on two occasions then the unit shuts down and a warning light comes on warning the user of the system that a service call is required.

Since modification within the spirit and scope of the invention may readily be effected by persons skilled within the art, it is to be understood that this invention is not limited to the particular embodiment described by way of example hereinabove.

What is claimed is:

1. A water jacket assembly for an instantaneous gas fired water heater, the assembly including pressed profiled plates made of copper or copper coated steel, one plate being the inverted image of the other, said plates being placed together in pairs, the pairs of plates being arranged in a parallel array to form a heat exchanger, the heat exchanger being bordered by a water jacket comprising overlapping side and end panels of copper or copper coated steel attached to the array of plates, the assembly being fused together to define a combustion chamber with discrete combusted gases and water passages within said assembly.

2. The water jacket assembly according to claim 1 wherein the profiled plates of the heat exchanger are adapted to cause turbulent flow of water through the water passages, and turbulent flow of combusted gases past the exterior, the exterior also providing escape routes for condensate that in use collects on the external surfaces of the heat exchanger.

3. An instantaneous gas fired water heater including a water jacket assembly according to claim 2 wherein the water jacket has a cold water inlet and a hot water outlet, at least one gas burner being positioned within the combustion chamber whereby cold water flows through the assembly to exit as hot water.

4. The water heater according to claim 3 wherein the at least one gas burner it positioned above the heat exchanger and the heater includes a fan that mixes gas with air and forces the gas/air mixture to the burner and, as combusted gases past the heat exchanger.

5. An instantaneous gas fired water heater including a water jacket assembly according to claim 1 wherein the water jacket has a cold water inlet and a hot water outlet, at least one gas burner being positioned within the combustion chamber whereby cold water flows through the assembly to exit as hot water.

6. The water heater according to claim 5 wherein the at least one gas burner is positioned above the heat exchanger and the heater includes a fan that mixes gas with air and forces the gas/air mixture to the burner and, as combusted gases past the heat exchanger.

7. A method of manufacturing a water jacket assembly comprising pressing profiled heat exchanger plates, side panels and end panels out of copper or copper coated steel, placing two plates together, one being the inverted image of the other to form a pair of abutting plates, placing a plurality of pairs of heat exchanger plates together to form a sandwich, attaching the side panels to the sandwich and placing the end plates on each corner so that the side and end panels overlap, holding the assembly with a jig, and placing the assembly in an oven for a predetermined time to fuse the copper surfaces together to provide an integral assembly having a combustion chamber and discrete combusted gases and water passageways within said assembly.

8. A heating system for heating water with combustion products comprising:
- a heat exchanger assembly including
  - at least two heat exchange elements each having two plates providing at least one heat exchanger liquid passageway therebetween,
  - a combustion products passageway being formed between adjacent heat exchange elements, and
- a jacket extending from said heat exchanger assembly, said jacket including plates formed to provide at least one jacket liquid passageway, said jacket defining a combustion chamber adjacent said heat exchanger assembly, and
- wherein said heat exchanger elements and said jacket are connected so as to allow liquid to pass therethrough.

9. A heating system as claimed in claim 8, wherein said plates of said heat exchange elements are adapted to cause turbulent flow of water through said at least one heat exchanger liquid passageway.

10. A heating system as claimed in claim 9, wherein said plates include an array of dimples lining the at least one heat exchanger liquid passageway.

11. A heating system as claimed in claim 8, wherein said plates of said heat exchange elements are adapted to cause turbulent flow of combustion products past the exterior of said heat exchange elements.

12. A heating system as claimed in claim 11, wherein each of said plates include an array of dimples along a surface opposite said other plate of said heat exchange element.

13. A heating system as claimed in claim 8, wherein said plates of said heat exchange elements include exterior surfaces having an escape path for condensation that may form during use.

14. A heating system as claimed in claim 8, wherein each of said heat exchange elements have one liquid passageway which extends across a portion of said heat exchange element in one direction and across said portion in an opposite direction in a serpentine manner.

15. A heating system as claimed in claim 14, wherein the liquid passageway extends across the full width of said heat exchange element.

16. A heating system as claimed in claim 14, wherein the liquid passageway extends across said heat exchange element in a zig zag or sinusoidal configuration.

17. A heating system as claimed in claim 8, wherein said plates of said heat exchange elements each have a series of discrete dimples therein, whereby adjacent dimples on one plate are spaced from the series of adjacent and partially overlapping dimples on the other plate to form the at least one liquid passageway.

18. A heating system as claimed in claim 8, wherein the at least one liquid passageway crosses the heat exchange element at least twice.

19. A heating system as claimed in claim 8, wherein said heat exchange element is formed from identical plates placed back to back.

20. A heating system as claimed in claim 8, wherien said heat exchange elements are like oriented in said heat exchanger assembly and placed in parallel.

21. A heating system as claimed in claim 8, wherein during use, combustion products are forced around the outside of said heat exchange elements through combustion products passageways that provide multiconvoluted paths for combustion products to pass through said heat exchanger assembly.

22. A heating system for heating water with combustion products comprising:
- a heat exchanger assembly having a plurality of first and second plates held together to form at least one liquid passageway therebetween, each pair of first and second plates when held together forming a heat exchange element, and adjacent heat exchange elements form a combustion products flow path therebetween, and
- wherein said heat exchanger assembly having said at least one liquid passageway in each heat exchange element extending across a portion of each heat exchange element in one direction and across said portion in the opposite direction in a serpentine pattern.

23. A heating system as claimed in claim 22, wherein the liquid passageway extends across the full width of said heat exchange element.

24. A heating system as claimed in claim 22, wherein the liquid passageway extends across said heat exchange element in a zig zag or sinusoidal configuration.

25. A heating system as claimed in claim 22, wherein each of said plurality of first and second plates includes an array of dimples along the at least one liquid passageway.

26. A heating system as claimed in claim 25, wherein each of said plurality of first and second plates are adapted to cause turbulent flow of water through at least one liquid passageway therebetween by the provision of an array of dimples thereon.

27. A heating system as claimed in claim 22, wherein each of said plurality of first and second plates of said heat exchange elements are adapted to cause turbulent flow of combustion products past the exterior of said heat exchange elements.

28. A heating system as claimed in claim 27, wherein each of said plurality of first and second plates include an array of dimples thereon on a surface opposite said other plate of said heat exchange element.

29. A heating system as claimed in claim 22, wherein each of said plurality of first and second plates includes an exterior surface having an escape path for condensation that may form during use.

30. A heating system as claimed in claim 22, wherein each of said plurality of first and second plates each have a series of discrete dimples therein, whereby adjacent dimples on said first plate are connected by the series of adjacent and partially overlapping dimples on said second plate to form the liquid passageway.

31. A heating system as claimed in claim 22, wherein the serpentine pattern is such that the liquid passageway crosses the heat exchange element at least twice.

32. A heating system as claimed in claim 22, wherein said first and second plates are identical plates placed back to back.

33. A heating system as claimed in claim 22, wherein said heat exchange elements are like oriented in said heat exchanger and placed in parallel.

34. A heating system as claimed in claim 22, wherein during use, combustion products are forced through the combustion products flow path which is around the outside of said liquid passageways which with adjacent passageways on an adjacent element form multiconvoluted paths for combustion products through said heat exchanger assembly.

35. A heating system for heating water with combustion products comprising:
- a plurality of first and second plates held together to form at least one liquid passageway therebetween, each pair of first and second plates form a heat exchange element, and
- adjacent heat exchange elements form a combustion products flow path therebetween,
- each of said plates having a series of discrete dimples therein, whereby adjacent dimples on one plate are connected by the series of adjacent dimples on the other plate to form the at least one liquid passageway, wherein said dimples cause turbulent flow of liquid through the at least one liquid passageway, and
- outside surfaces of said dimples cause turbulent flow of combustion products past the exterior of said heat exchange elements through at least one combustion products flow path.

36. A heating system as claimed in claim 35, wherein the liquid passageways are convoluted.

37. A heating system as claimed in claim 35, wherein during use, combustion products are forced through the at least one combustion products flow path which is around the outside of the liquid passageways which with adjacent liquid passageways on an adjacent heat exchange element form multiconvoluted paths for combustion products through said heat exchanger assembly.

38. A heat exchanger assembly comprising:
- at least two heat exchange elements each having two plates providing at least one heat exchanger liquid passageway therebetween formed through a series of concave regions formed in adjacent plates, the at least one heat exchanger liquid passageway travels across the heat exchange elements before traveling across the heat exchange element in an opposite direction to form a serpentine pattern, and
- a combustion products passageway being formed between adjacent heat exchange elements.

39. A heating system as claimed in claim 38, wherein the liquid passageway extends across said heat exchange element in a zig zag or sinusoidal configuration.

* * * * *